US007895427B2

(12) United States Patent
Sinha et al.

(10) Patent No.: US 7,895,427 B2
(45) Date of Patent: Feb. 22, 2011

(54) METHOD AND SYSTEM OF EXECUTING A SOFTWARE APPLICATION IN HIGHLY CONSTRAINED MEMORY SITUATION

(75) Inventors: Rajesh Kumar Sinha, Bangalore (IN); Vivek Pandey, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 846 days.

(21) Appl. No.: 11/846,527

(22) Filed: Aug. 29, 2007

(65) Prior Publication Data
US 2008/0077787 A1 Mar. 27, 2008

(30) Foreign Application Priority Data
Sep. 26, 2006 (IN) .................. 2125/DEL/2006

(51) Int. Cl.
*G06F 15/177* (2006.01)
(52) U.S. Cl. ................ 713/2; 713/1; 713/100
(58) Field of Classification Search ........ 713/1, 713/2, 100
See application file for complete search history.

(56) References Cited

U.S. PATENT DOCUMENTS

| 6,446,203 | B1 | 9/2002 | Aguilar et al. |
| 6,708,235 | B2* | 3/2004 | Pearce et al. .................. 710/23 |
| 2003/0140238 | A1* | 7/2003 | Turkboylari ................ 713/193 |
| 2005/0044348 | A1 | 2/2005 | O'Connell |
| 2005/0055515 | A1* | 3/2005 | Greicar ...................... 711/154 |
| 2007/0078548 | A1* | 4/2007 | May et al. ...................... 700/94 |

* cited by examiner

*Primary Examiner*—Dennis M Butler
(74) *Attorney, Agent, or Firm*—Charles Bergere

(57) ABSTRACT

A method and system for executing a software application having a binary size that is larger than an available memory space in an embedded system from which the software application will execute. The software application is split into one or more initialization sequences and a main code sequence. The method includes loading (302) each initialization sequence of the one or more initialization sequences in the memory space prior to its execution, and executing (304) each initialization sequence of the one or more initialization sequences out of the memory space. Further, the method includes loading (306) the main code sequence in the memory space after the execution of the one or more initialization codes and then executing (308) the main code sequence out of the memory space.

5 Claims, 3 Drawing Sheets

METHOD AND SYSTEM OF EXECUTING A SOFTWARE APPLICATION IN HIGHLY CONSTRAINED MEMORY SITUATION

BACKGROUND OF THE INVENTION

The present invention relates generally to embedded systems, and more specifically, to a method and system for executing a software application that is larger than an available memory out of which the software has to execute in the embedded system.

An embedded system is a computer system that is designed to perform a specific function. Some examples of devices having embedded systems include Personal Digital Assistants (PDA), mobile devices and routers. Embedded systems are usually designed with limited hardware to minimize cost. Software applications in an embedded system are usually stored in its Read Only Memory (ROM) and executed out of its Random Access Memory (RAM). Examples of a software application include firmware like the Basic Integrated Operating System (BIOS) in a personal computer, Open Firmware and a Media Access Control (MAC) software code in a network processor.

A bootloader is a special program used to load software code in the memory to start an embedded system application when a user turns on an embedded system device. A boot sequence is a set of operations performed by the embedded system to load a software application in the memory of the embedded system. Because of the use of limited hardware in an embedded system, the size of the internal RAM available for executing a software application in an embedded system can be less than the binary size of the software application itself. In an embedded system with an external RAM, the external RAM can be used in conjunction with the internal RAM to execute the software application.

For an embedded system without an external RAM, the internal RAM needs to be used efficiently to execute a software application. Hence, it is desirable to reduce the binary size of software code that is executed in the RAM of an embedded system.

BRIEF DESCRIPTION OF THE DRAWINGS

The following detailed description of the preferred embodiments of the present invention will be better understood when read in conjunction with the appended drawings. The present invention is illustrated by way of example and not limited by the accompanying figures, in which like references indicate similar elements.

DETAILED DESCRIPTION OF THE PRESENT INVENTION

Figure 1:
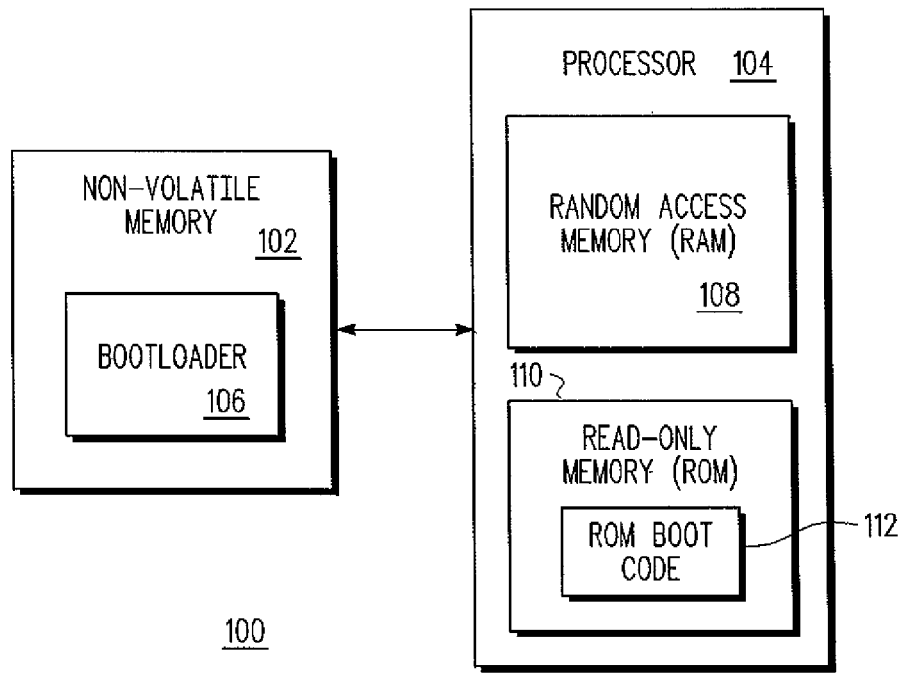
FIG. 1 is a schematic block diagram of an embedded system, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for executing a software application of a binary size that is larger than an available memory space in an embedded system out of which the software application will execute is provided. The software application is split by a software developer into two or more code sections and stored in the non-volatile memory of the embedded system. The two or more code sections include one or more initialization sequences that will run once and a main code sequence that will continue to run as long as the device is turned on. The method includes loading each initialization sequence of the one or more initialization sequences in the memory space sequentially, in a pre-defined order. The method also includes executing each initialization sequence out of the memory space immediately after loading it. Further, the method includes loading the main code sequence in the memory space after the execution of the one or more initialization sequences and then executing the main code sequence out of the memory space.

In another embodiment of the present invention, a bootloader for executing a software application of a binary size that is larger than an available memory space in an embedded system from which the software application will execute is provided. The software application is split into two or more code sections and placed in the non-volatile memory of the embedded system. The two or more code sections include one or more initialization sequences that will run once and a main code sequence that will continue to run as long as the device is turned on. The bootloader includes a loading module that loads the one or more initialization sequences and the main code sequence in a pre-defined order. The bootloader also includes a saving module that saves the context of the bootloader before the execution of each initialization sequence of the one or more initialization sequences. Further, the bootloader includes an executing module that executes the one or more initialization sequences and the main code sequence in the pre-defined order.

Embodiments of the present invention provide a method and system for executing a software application with a binary size that is larger than the available memory space in an embedded system. The software application in the embedded system that is to be executed has been split manually into two or more code sections by a software developer and stored in the non-volatile memory of the embedded system. The two or more code sections include one or more initialization sequences and a main code sequence. The method enables the execution of the one or more initialization sequences and the main code sequence of the software application in succession. A bootloader downloads the binary code of the one or more initialization sequences and the main code sequence to the internal RAM before executing them sequentially. An initialization sequence and the main code sequence require less memory when executed individually, as compared to the entire software application being executed at once. Hence, this method and system is suitable for use in an embedded system with limited internal RAM. Further, since the need for a larger memory space is eliminated, the method is economical, as compared to a system requiring an external RAM. Moreover, the requirement for an external memory can be avoided.

Referring now to FIG. 1, a schematic block diagram of an embedded system 100 comprising a Non-Volatile Memory (NVM) 102 and a processor 104 is shown, in accordance with an embodiment of the present invention. The NVM 102 is a memory device that can retain stored information even when it is powered off. Examples of non-volatile memory include, but are not limited to, Read-Only memory (ROM), flash memory (NAND and NOR), EEPROM and optical disc drives. Examples of the processor 104 are integrated circuits that include both a microprocessor and a digital signal processor, such as 3G baseband integrated circuits available from Freescale Semiconductor, Inc. The NVM 102 includes a bootloader 106. A bootloader is a special program used to load and execute a software application from a non-volatile memory into the RAM of an embedded system when a user turns on an embedded system device. In an embodiment of the present invention, the software application can be firmware of the embedded system. Examples of a software application include the Basic Integrated Operating System (BIOS), Open Firmware and a Media Access Control (MAC) software code in a network processor. In an embodiment of the present invention, the NVM 102 includes a software application to be executed. A boot sequence is a set of operations performed by the embedded system to load a software application in the memory space of the embedded system. In an embodiment of the present invention, the memory space is a Random Access Memory (RAM).

The processor 104 includes a Random Access Memory (RAM) 108 and a Read Only Memory (ROM) 110. The ROM 110 includes a ROM Boot code 112. The ROM Boot code 112 is a software program that causes an instance of the bootloader 106 to be copied from the NVM 102 to the RAM 108. The bootloader 106, after being copied into the RAM 108, loads the contents of the software application stored in the NVM 102 into the RAM 108 prior to the execution of the software application by the processor 104.

Figure 2:
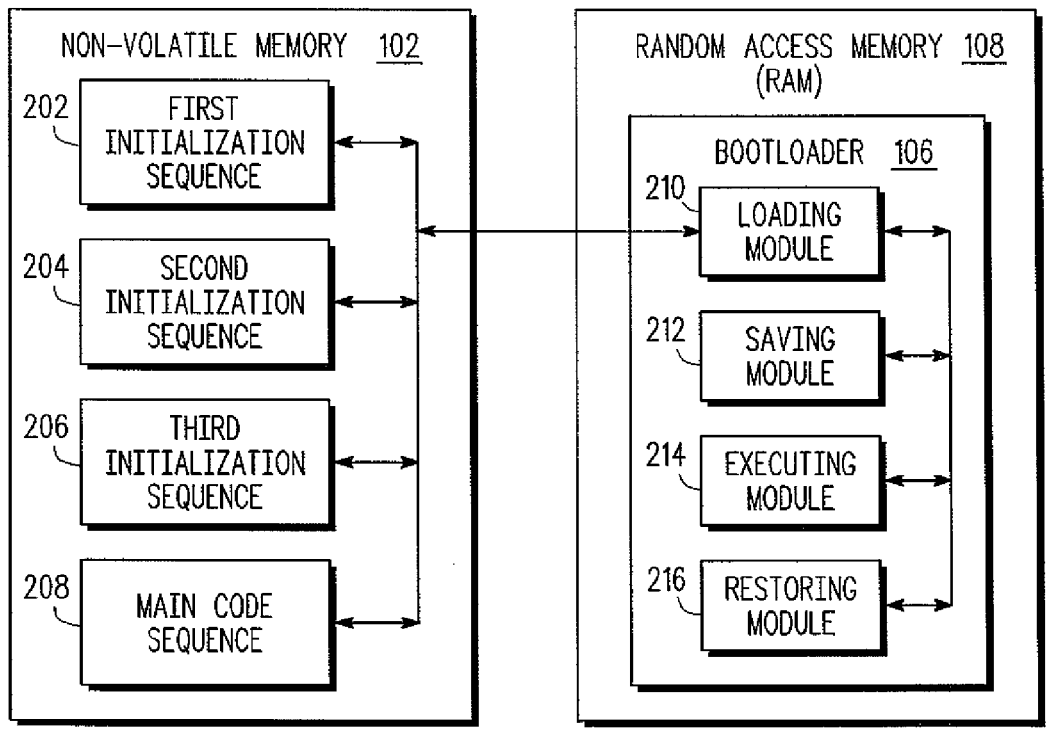
FIG. 2 is a schematic block diagram illustrating the software elements used in the execution of a software application in the memory of an embedded system, in accordance with an embodiment of the present invention.

Referring now to FIG. 2, a schematic block diagram illustrating the software elements used in the execution of the software application moved to the RAM 108 is shown, in accordance with an embodiment of the present invention. In an embodiment of the present invention, the software application in the NVM 102 is split manually into two or more code sections by a software developer. The two or more code sections of the software application include one or more initialization sequences and a main code sequence. The two or more code sections are then compiled individually and saved in the NVM 102. For the purpose of this description, the software application is shown as split into a first initialization sequence 202, a second initialization sequence 204, a third initialization sequence 206, and a main code sequence 208. In an embodiment of the present invention, the one or more initialization sequences are binary codes of auxiliary processes, while the main code sequence is the binary code of the main process of an embedded system 100. The auxiliary processes are one-time executable software routines, and the main process executes continuously after the execution of the auxiliary processes until the embedded system 100 is powered down. For example, in a mobile device, the one or more initialization sequences are executed to initialize the mobile device once powered on, and the main code sequence is executed to perform the functions of the mobile device, including establishing connections and communicating with other electronic devices.

The bootloader 106 copied into the RAM 108 by the ROM boot code 112 includes a loading module 210, a saving module 212, an executing module 214, and a restoring module 216. The loading module 210 loads the first initialization sequence 202, the second initialization sequence 204, the third initialization sequence 206 and the main code sequence 208 into the RAM 108. In an embodiment of the present invention, the loading module 210 sequences the first initialization sequence 202, the second initialization sequence 204, the third initialization sequence 206 and the main code sequence 208 so that they are loaded and executed in a pre-defined order (i.e., the initialization sequences are not simultaneously loaded into the RAM 108). For example, the first initialization sequence 202 is loaded first into the RAM 108 and then executed, followed by the second initialization sequence 204 by loaded and executed and then the third initialization sequence 206 by loaded and executed. Finally, the main code sequence 208 is loaded and then executed. The saving module 212 saves the context of the bootloader 102 after the bootloader 102 loads the contents of each initialization sequence into the RAM 108, prior to the execution of the initialization sequence. In an embodiment of the present invention, the context of the bootloader 106 is the software state of the bootloader 106. The software state includes information about the location of the initialization sequence in the RAM 108, as well as about the state of the registers and counters of the processor 104 used in the loading of the initialization sequence.

After the saving module 212 has saved the context of the bootloader 106, the executing module 214 initiates execution of the initialization sequence. For example, if the first initialization code sequence 202 is loaded into the RAM 108 by the bootloader 106, the saving module 212 stores the context of the bootloader just prior to the execution of the first initialization code sequence 202. The restoring module 216 then restores the context of the bootloader 106 after the executing module 214 has executed the initialization sequence. Restoring the context of the bootloader 106 aids in loading the next initialization sequence in the pre-defined order as defined in the loading module 210. In an embodiment of the present invention, the second initialization sequence 204 is the next initialization sequence. After the execution of each of the one or more initialization code sequences, the main code sequence 208 is executed by the executing module 214.

Figure 3:
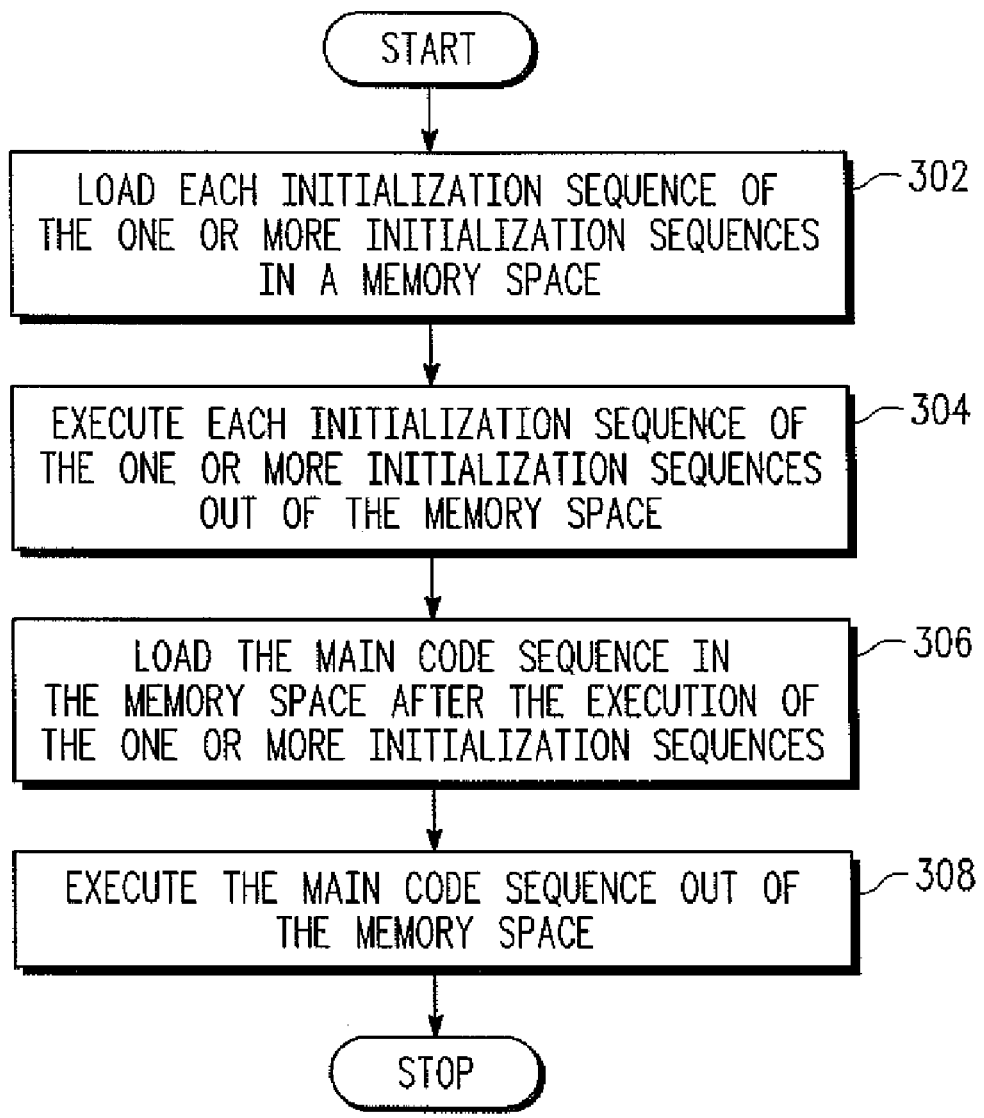
FIG. 3 is a flowchart depicting a method for executing a software application of a binary size that is larger than an available memory space in an embedded system, in accordance with an embodiment of the present invention.

Referring now to FIG. 3, a flowchart depicting a method for executing a software application with a binary size that is larger than the available memory space in an embedded system is shown, in accordance with an embodiment of the present invention. As previously discussed, the software application is split into two or more code sections. The two or more code sections include one or more initialization sequences and a main code sequence. At step 302, an initialization sequence of the one or more initialization sequences is loaded in the memory space prior to its execution by the loading module 210. In an embodiment of the present invention, the one or more initialization sequences are the binary codes of auxiliary processes, while the at least one main code sequence is the binary code of the main process of the embedded system 100. The auxiliary processes are one-time executable software codes for initialization, and the main process executes continuously, after the execution of the auxiliary processes, until the embedded system 100 is powered down. The context of the bootloader 106 is saved before the execution of an initialization sequence of the one or more initialization sequences by the saving module 212. In an embodiment of the present invention, the context of the bootloader 106 includes a software state of the processor At step 304, each of the one or more initialization sequences are executed by the processor 104 out of the available memory space of the embedded system 100. In an embodiment of the present invention, the one or more initialization codes are used to initialize either the hardware associated with the embedded system 100 or resources associated with the embedded system 100. An example of a resource associated with the embedded system 100 includes, but is not limited to, memory, display unit, Radio Frequency (RF) Hardware or connectivity modules such as a Universal Serial Bus (USB), a Universal Asynchronous Receiver-Transmitter (UART), and Bluetooth. After executing an initialization code of the one or more initialization codes, the context of the bootloader 106 is restored by the restoring module 216. After each initialization sequence of the one or more initialization sequences has been executed, the main code sequence is loaded into the memory space by the loading module 210, at step 306. At step 308, the main code sequence is executed and runs on the processor 104 out of the available memory space available of the embedded system 100. In an embodiment of the present invention, the loading module 210 loads the initialization code of the one or more initialization codes and the main code sequence in a pre-defined order.

Figure 4:
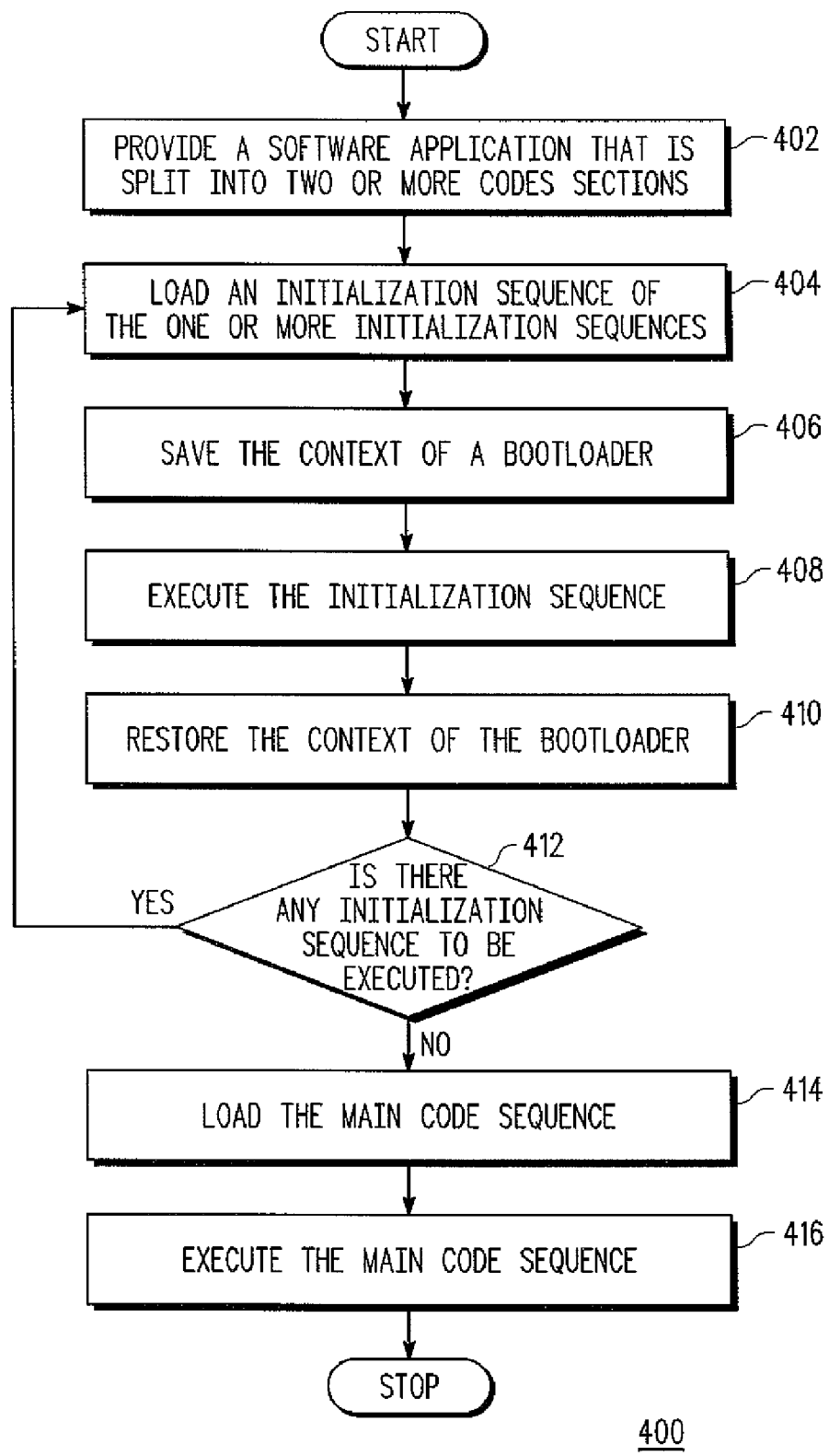
FIG. 4 is a flowchart depicting a method for executing a software application of a binary size that is larger than the available memory space, in accordance with another embodiment of the present invention.

Referring now to FIG. 4, a flowchart depicting a method for executing a software application having a binary size that is larger than the available memory space is shown, in accordance with another embodiment of the present invention. At step 402, a software application that has been split into two or more code sections is provided. In an embodiment of the present invention, the splitting of the software application into the two or more code sections is performed manually. In another embodiment of the present invention, these two or more code sections include one or more initialization sequences and a main code sequence.

At step 404, an initialization sequence of the one or more initialization sequences is loaded by the bootloader 106 into the RAM 108. At step 406, the context of the bootloader 106 is saved by the saving module 212 prior to the execution of the initialization sequence. Thereafter, the initialization sequence is executed by the executing module 214 at step 408. At step 410, the context of the bootloader 106 is restored by the restoring module 216, after the initialization sequence has been executed. Thereafter, it is determined at step 412 whether there are any more initialization sequences of the one or more initialization sequences to be executed. When each of the one or more initialization sequence has not been executed, the method returns to step 404, and another initialization code of the one or more initialization codes is loaded into the RAM 108. When there are no more initialization codes to be executed, the main code sequence is loaded into the RAM 108 at step 414. At step 416, the main code sequence is executed, after it has been loaded into the RAM 108. In one embodiment, the one or more initialization sequences and the main code sequence are sequenced in a pre-defined order by the loading module 210, and then executed in the pre-defined order by the executing module 214.

While various embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

The invention claimed is:

1. In an embedded system, a method of executing a software application having a binary size that is larger than a memory space out of which the software application will execute, wherein the software application is split into two or more code sections, and wherein the two or more code sections comprise one or more initialization sequences and a main code sequence, the method comprising:
    loading each initialization sequence of the one or more initialization sequences in the memory space;
    sequencing the one or more initialization sequences in a pre-defined order prior to loading each initialization sequence of the one or more initialization sequences;
    executing each initialization sequence of the one or more initialization sequences out of the memory space;
    loading the main code sequence in the memory space after the execution of the one or more initialization sequences;
    executing the main code sequence out of the memory space, wherein the steps of loading each initialization sequence of the one or more initialization sequences, loading the main code sequence and sequencing the one or more initialization sequences are performed by a bootloader;
    saving the context of the bootloader before the execution of each initialization sequence of the one or more initialization sequences, wherein the bootloader loads the one or more initialization sequences before executing the one or more initialization sequences and loads the main code sequence before executing the main code sequence; and
    restoring the context of the bootloader after execution of each initialization sequence of the one or more initialization sequences.

2. The method of executing the software application of claim 1, wherein the context of the bootloader includes a software state of the bootloader, and the software state includes information about the location of each initialization sequence in the memory space and information about the state of processes and registers used in loading each initialization sequence.

3. A bootloader stored on a tangible computer readable medium, the bootloader for executing a software application having a binary size that is larger than a memory space of the system out of which the software application will execute, wherein the software application is split into two or more code sections, and wherein the two or more code sections comprise one or more initialization sequences and a main code sequence, the bootloader comprising:
    a loading module that loads the one or more initialization sequences and the main code sequence in a pre-defined order;
    a saving module that saves the context of the bootloader before the execution of each initialization sequence of the one or more initialization sequences;
    an executing module that executes the one or more initialization sequences and the main code sequence in the pre-defined order; and
    a restoring module that restores the context of the bootloader after the execution of the initialization sequence.

4. The bootloader for executing the software application of claim 3, wherein the memory space is a random access memory (RAM).

5. A computer program product stored on a tangible computer readable medium, the product for executing a software application having a binary size that is larger than a memory space out of which the software application will execute in an embedded system, wherein the software application is split into two or more code sections, and wherein the two or more code sections comprise one or more initialization sequences and a main code sequence, the computer program product comprising:

- a first set of program instructions for loading each initialization sequence of the one or more initialization sequences in the memory space;
- a second set of program instructions for executing each initialization sequence of the one or more initialization sequences out of the memory space;
- a third set of program instructions for loading the main code sequence in the memory space after the execution of the one or more initialization codes;
- a fourth set of program instructions for executing the main code sequence out of the memory space;
- a fifth set of program instructions for sequencing the one or more initialization sequences in a pre-defined order prior to loading each initialization sequence of the one or more initialization sequences;
- a sixth set of program instructions for saving the context of a bootloader before the execution of each initialization sequence of the one or more initialization sequences, wherein the bootloader is a software program that loads the one or more initialization sequences before executing the one or more initialization sequences and loads the main code sequence before executing the main code sequence; and
- a seventh set of program instructions for restoring the context of the bootloader after execution of each initialization sequence of the one or more initialization sequences.

* * * * *